E. VAN BUREN.
WIND SHIELD.
APPLICATION FILED JAN. 23, 1913.
1,111,980.
Patented Sept. 29, 1914.
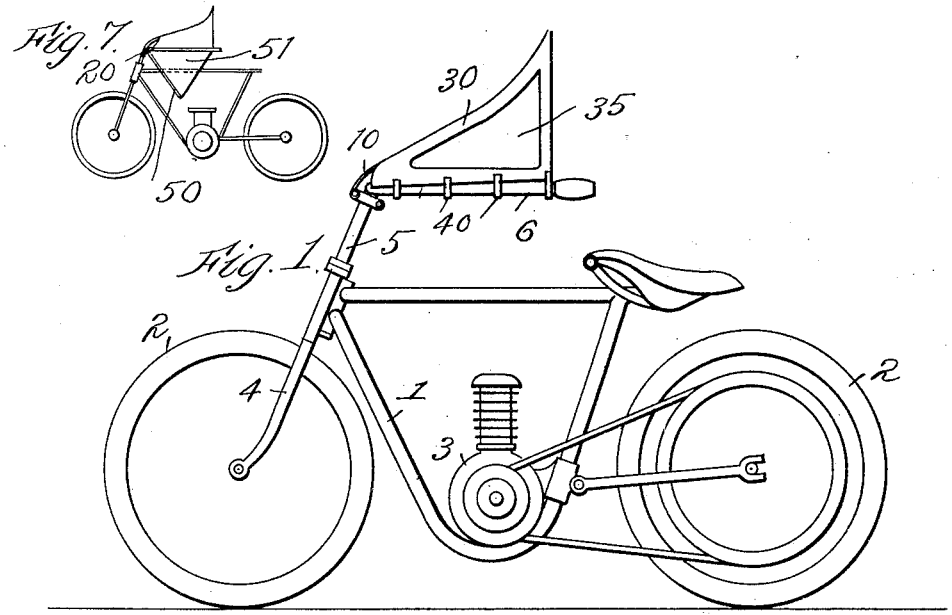
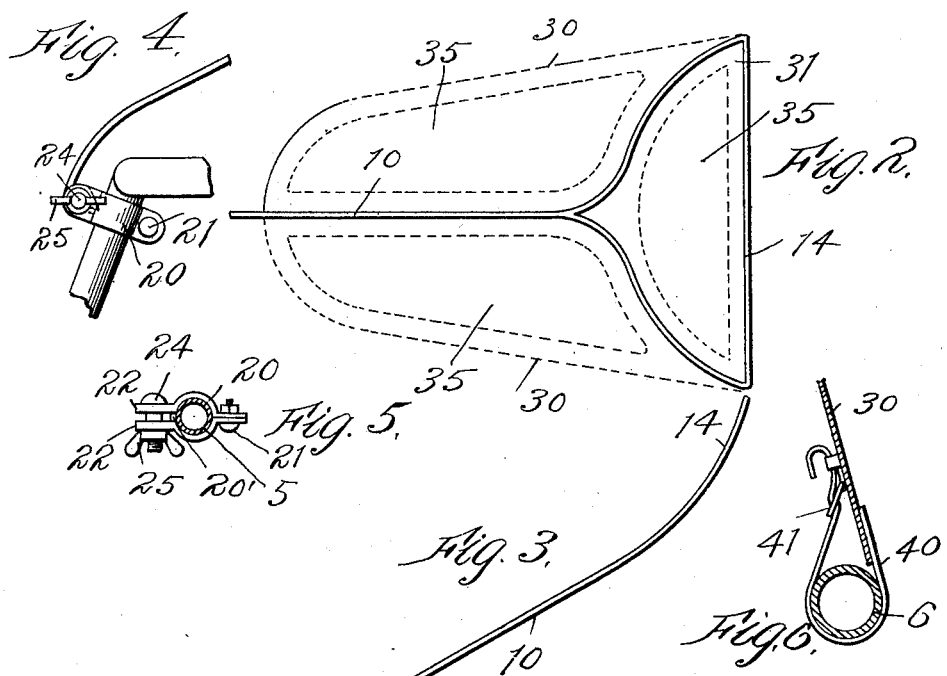

UNITED STATES PATENT OFFICE.

EDMUND VAN BUREN, OF NEW YORK, N. Y.

WIND-SHIELD.

1,111,980.   Specification of Letters Patent.   Patented Sept. 29, 1914.

Application filed January 23, 1913. Serial No. 743,772.

*To all whom it may concern:*

Be it known that I, EDMUND VAN BUREN, a citizen of the United States, residing in the city, county, and State of New York, have invented certain new and useful Improvements in Wind-Shields, of which the following is a specification.

My invention relates generally to improvements in wind shields and more particularly to wind shields to be employed in protecting the riders of motorcycles and the like.

The objects of my invention are to construct a wind shield for motorcycles that will protect the rider against wind and dust, allow the steering members to be perfectly free and unhampered when the shield is adjusted to proper position on the machine, and to make said shield in such manner and of such material that the same can be adjusted to fit the requirements of the rider.

To attain these and other objects and advantages my invention comprises a wind shield that can be attached to the steering member in such manner that it will readily yield to the movements of the same, but at all times be in position to fully protect the rider.

A further object of the invention is to make the wind shield so that it can be readily attached and detached, preferably to and from the handle bars of the steering member, and will adjust itself to the several makes of machines now in use. By fastening the forward end of the spring supporting frame of the wind shield to the steering post and attaching the deflecting side curtains to the handle bars, I am able to make the shield properly adjust itself to the desired position on the machine.

With these ends in view I have devised a wind shield, hereinafter described in detail and the features of merit and novelty pointed out in the claims.

In the accompanying drawings: Figure 1 is a side elevation of a motorcycle showing the wind shield applied to the same. Fig. 2 is a plan view of the supporting frame showing the shield in dotted lines. Fig. 3 is an elevation of the supporting frame. Fig. 4 is a detail showing how the supporting frame is attached to the steering post. Fig. 5 is a plan view of the clamp which engages the steering post and holds the supporting frame. Fig. 6 is a detail in section showing how the shield is attached to the handle bars. Fig. 7 shows a modified form of my invention.

Similar characters indicate like parts throughout the specification and drawings.

In the practical application and construction of my invention, 1 is the frame of an ordinary motorcycle, 2, 2 the wheels, 3 the engine, 4 the forks, 5 the steering head and 6 the handle bars. The style, shape, size and arrangement of these several parts are not essential to my invention in view of the latitude of its adaptability.

The supporting frame 10 of the shield is preferably made from a piece of spring wire or flexible rod of any suitable material. The lower end of the spring frame, that is, the end which is fastened to the motorcycle, in the manner hereinafter described, is provided with an eye 12. The upper portion of the supporting frame is bent around on itself to form a loop 14, the purpose of which will be hereinafter explained.

Clamped around the steering post under the handle bars is a bracket 20, which is held in place by means of a screw 21. This clamp has two ears 22, 22 between which fits the eye 12 on the lower end of the supporting frame 10. Passing through these ears 22 and the eye 12, for the purpose of binding said parts together, is a bolt 24 having a winged nut 25. It will be noticed that the eye 12 has a lug 12′ formed thereon which engages shoulder 20′ formed between the ears 22 on the clamp 20 when the supporting frame is attached in position on the clamp 20, as shown in dotted lines in Fig. 4. The object in having the lug 12′ engage the shoulder 20′ is to hold the supporting frame in proper position to support the shield.

Shaped to suit the contour of the supporting frame 10 and adapted to act as the shield proper, are side curtains 30. These curtains are preferably made of leather and sewed together over the supporting frame to a point where the frame curves to form the loop 14. Inserted within the loop 14 is a curtain 31 which follows the contour of the supporting frame and is sewed to the tops of the side curtains 30, and around on itself over the straight portion of the loop 14. In order to give a full view of the road to the rider I preferably cut out the side curtains 30 and the top curtain 31 and insert within said cut out portion, celluloid, mica or some desirable transparent material as shown at 35. These transparent pieces of material may be fastened to the curtains 30 and 31 in any suitable manner, such as stitching, pasting, pocketing or the like.

The side curtains 30 can be fastened to the handle bars in any suitable manner such as clamps, hooks or snap buttons, but I have here shown straps with buckles. Straps 40 are attached to the outside of curtains 30 and pass around the handle bar and have their free ends fastened on the inside of the curtains by means of buckles 41, said buckles being attached to the inside of the curtains.

The frame 30 being of spring material and being held in a manner to prevent the upper or loop end from dropping down, by reason of the lug 12' and shoulder 20', any downward pull on the straps 40 around the handle bars will tend to draw the curtains taut and hold them in the desired position. By pulling the holding straps 40 well down around the handle bars the top edge of the shield can be drawn farther down if the rider so desires to adjust it.

It will be noticed that the shield when formed in the manner described presents a surface that deflects the wind and prevents it from striking the rider. The forward end of the shield splits the wind and deflects it to each side of the rider while the curved top of the shield throws the wind upward and away from the rider. The movement of the handle bars to control the steering member does not move the shield sufficiently out of alinement with the rider to interfere with the value of the same.

Fig. 7 shows a modified form of the invention wherein the bracket 20 carries downwardly projecting members 50, one on each side of the frame, to which are attached curtains 51, the tops of said curtains 51 being fastened or forming part of the curtains 30. In addition to protecting the rider this form of shield tends to deflect the wind down against the motor.

Of course it is obvious that the details of construction can be varied without departing from the spirit of the invention.

Claims.

1. A wind shield for motorcycles, comprising a supporting frame carried by the steering member and projecting above the same, and flexible deflecting members carried by said supporting frame, said deflecting members being fastened to the steering member.

2. A wind shield for motorcycles, comprising a flexible supporting frame, means for attaching one end of said frame to the steering member, transparent deflecting members supported on said frame and means for adjustably attaching said deflecting members to the steering member.

3. A wind shield for motorcycles, comprising a supporting frame attached to the steering head, flexible deflecting members carried by said frame and means on said deflecting members for attaching them to the steering member.

4. In a motorcycle, in combination with the steering member, a shield supporting frame attached to said steering member above the same, deflecting curtains carried by said supporting frame and means for fastening said curtains to the rearwardly projecting portions of the steering member.

5. A wind shield for motorcycles, comprising a supporting frame having its forward end attached to the steering member and extending upwardly and rearwardly in a curved manner over said steering member, and a transparent deflecting member carried by said frame in a manner to permit the lower edge of said deflecting member to be fastened to said steering member.

6. A wind shield for motorcycles, comprising a spring frame, clamping means attached to the steering member and adapted to engage and hold the spring frame, means on the spring frame and clamping means for preventing the displacement of said spring frame, transparent deflecting curtains carried by the spring frame and means on said curtains for attaching them to the steering member.

EDMUND VAN BUREN.

Witnesses:
Wm. A. Courtland,
Louella F. Little.

---

Copies of this patent may be obtained for five cents each, by addressing the "Commissioner of Patents, Washington, D. C."